(12) United States Patent
Hart et al.

(10) Patent No.: US 8,523,729 B2
(45) Date of Patent: Sep. 3, 2013

(54) MULTI-SPEED TRANSMISSION

(75) Inventors: James M. Hart, Belleville, MI (US); Edward W. Mellet, Rochester Hills, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 133 days.

(21) Appl. No.: 13/112,033

(22) Filed: May 20, 2011

(65) Prior Publication Data

US 2012/0295754 A1  Nov. 22, 2012

(51) Int. Cl.
*F16H 3/44* (2006.01)

(52) U.S. Cl.
USPC .......................... 475/282; 475/288; 475/290

(58) Field of Classification Search
USPC .................................. 475/275–291, 296, 330
See application file for complete search history.

(56) References Cited

U.S. PATENT DOCUMENTS

| | | | |
|---|---|---|---|
| 6,558,287 B2 | 5/2003 | Hayabuchi et al. | |
| 7,101,305 B2 | 9/2006 | Tabata et al. | |
| 7,736,262 B2 * | 6/2010 | Suh | 475/276 |
| 7,753,820 B2 | 7/2010 | Phillips et al. | |
| 7,980,988 B2 * | 7/2011 | Phillips et al. | 475/284 |
| 2004/0048716 A1 * | 3/2004 | Ziemer | 475/286 |
| 2005/0090362 A1 | 4/2005 | Abe et al. | |
| 2009/0192012 A1 * | 7/2009 | Phillips et al. | 475/284 |
| 2009/0209389 A1 * | 8/2009 | Phillips et al. | 475/276 |
| 2009/0298637 A1 * | 12/2009 | Kim | 475/275 |
| 2010/0041509 A1 * | 2/2010 | Gumpoltsberger et al. | 475/275 |

* cited by examiner

*Primary Examiner* — Roger Pang

(57) ABSTRACT

A transmission includes an input and output member, two planetary gear set assemblies each having first, second, third, and fourth members, one interconnecting members continuously interconnecting a member of the first planetary gear set assembly with a member of the second planetary gear set assembly and six torque transmitting mechanisms selectively engageable to interconnect one of the first members, second members, third members, and fourth members with at least one of the input member and a stationary member. The torque transmitting mechanisms are selectively engageable in combinations of at least three to establish at least nine forward speed ratios and at least one reverse speed ratio between the input member and the output member.

39 Claims, 6 Drawing Sheets

| Gear State | Torque Transmitting Mechanisms | | | | | |
|---|---|---|---|---|---|---|
| | 24, 124, 224, 324, 424, 524, 624 | 26, 126, 226, 326, 426, 526, 626 | 28, 128, 228, 328, 428, 528, 628 | 30, 130, 230, 330, 430, 530, 630 | 32, 132, 232, 332, 432, 532, 632 | 34, 134, 234, 334, 434, 534, 634 |
| Rev | | X | X | X | | |
| N | | O | O | | | |
| 1st | | X | X | | | X |
| 2nd | X | | X | | | X |
| 3rd | | | X | X | | X |
| 4th | | | X | | X | X |
| 5th | | | | X | X | X |
| 6th | X | | | | X | X |
| 7th | | X | | | X | X |
| 8th | X | X | | | X | |
| 9th | | X | | X | X | |

MULTI-SPEED TRANSMISSION

FIELD

The invention relates generally to a multiple speed transmission having a plurality of planetary gear sets and a plurality of torque transmitting mechanisms, and more particularly to a transmission having eight speeds, four planetary gear sets and a plurality of torque transmitting mechanisms.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, first and second planetary gear set assemblies each having first, second, third, and fourth members. The output member is continuously interconnected with the third member of the second planetary gear set assembly. The transmission further includes a first interconnecting member continuously interconnecting the second member of the first planetary gear set assembly with the first member of the second planetary gear set assembly, six torque transmitting mechanisms each selectively engageable to interconnect one of the first members, second members, third members, and fourth members of the planetary gear set assemblies with at least one of the input member and a stationary member. The torque transmitting mechanisms are selectively engageable in combinations of at least three to establish at least nine forward speed ratios and at least one reverse speed ratio between the input member and the output member.

In another example of the present transmission, three of the six torque transmitting mechanisms are clutches and three of the six torque transmitting mechanisms are brakes.

In yet another example of the present transmission, a first of the six torque transmitting mechanisms is selectively engageable to directly interconnect the fourth member of the first planetary gear set assembly with the stationary member.

In yet another example of the present transmission, a second of the six torque transmitting mechanisms is selectively engageable to directly interconnect the third member of the first planetary gear set assembly with the stationary member.

In yet another example of the present transmission, a third of the six torque transmitting mechanisms is selectively engageable to directly interconnect the fourth member of the second planetary gear set assembly with the stationary member.

In yet another example of the present transmission, a fourth of the six torque transmitting mechanisms is selectively engageable to directly interconnect the third member of the first planetary gear set assembly with the input member.

In yet another example of the present transmission, a fifth of the six torque transmitting mechanisms is selectively engageable to directly interconnect the second member of the second planetary gear set assembly with the input member.

In yet another example of the present transmission, a sixth of the six torque transmitting mechanisms is selectively engageable to directly interconnect the first member of the first planetary gear set assembly with the input member.

In yet another example of the present transmission, a first of the six torque transmitting mechanisms is selectively engageable to directly interconnect the fourth member of the first planetary gear set assembly with the stationary member, a second of the six torque transmitting mechanisms is selectively engageable to directly interconnect the third member of the first planetary gear set assembly with the stationary member, a third of the six torque transmitting mechanisms is selectively engageable to directly interconnect the fourth member of the second planetary gear set assembly with the stationary member, a fourth of the six torque transmitting mechanisms is selectively engageable to directly interconnect the third member of the first planetary gear set assembly with the input member, a fifth of the six torque transmitting mechanisms is selectively engageable to directly interconnect the second member of the second planetary gear set assembly with the input member, and a sixth of the six torque transmitting mechanisms is selectively engageable to directly interconnect the first member of the first planetary gear set assembly with the input member.

In yet another example of the present transmission, the first planetary gear set assembly includes a first and a second planetary gear sets each having a first, second, and third members. The first member of the first planetary gear set assembly includes the first member of the first planetary gear set, the second member of the first planetary gear set assembly includes the second member of the first planetary gear set directly interconnected to the third member of the second planetary gear set by a second interconnecting member, the third member of the first planetary gear set assembly includes the third member of the first planetary gear set directly interconnected to the second member of the second planetary gear set by a third interconnecting member, and the fourth member of the first planetary gear set assembly includes the first member of the second planetary gear set.

In yet another example of the present transmission, the second planetary gear set assembly includes a third and a fourth planetary gear sets each having a first, second, and third members. The first member of the second planetary gear set assembly includes the first member of the third planetary gear set, the second member of the second planetary gear set assembly includes the second member of the third planetary gear set directly interconnected to the third member of the fourth planetary gear set by a fourth interconnecting member, the third member of the second planetary gear set assembly includes the third member of the third planetary gear set directly interconnected to the second member of the fourth planetary gear set by a fifth interconnecting member, and the fourth member of the second planetary gear set assembly includes the first member of the fourth planetary gear set.

In yet another example of the present transmission, the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

In yet another example of the present transmission, the first members of the planetary gear sets are sun gears, the second members of the first and third planetary gear sets are planet carrier members, the second members of the second and fourth planetary gear sets are ring gears, the third members of the first and third planetary gear sets are ring gears, and the third member of the second and fourth planetary gear sets are planet carrier members.

In yet another example of the present transmission, the second planetary gear set assembly includes a third and a fourth planetary gear sets each having a first, second, and third members. The first member of the second planetary gear set assembly includes the first member of the fourth planetary gear set, the second member of the second planetary gear set assembly includes the second member of the fourth planetary gear set directly interconnected to the third member of the third planetary gear set by a fourth interconnecting member, the third member of the second planetary gear set assembly includes the second member of the third planetary gear set, and the fourth member of the second planetary gear set assembly includes the first member of the third planetary gear set directly interconnected to the first member of the fourth planetary gear set by a fifth interconnecting member.

In yet another example of the present transmission, the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

In yet another example of the present transmission, the second planetary gear set assembly includes a third and a fourth planetary gear sets each having a first, second, and third members. The first member of the second planetary gear set assembly includes the third member of the third planetary gear set directly interconnected to the first member of the fourth planetary gear set by a fourth interconnecting member, the second member of the second planetary gear set assembly includes the second member of the fourth planetary gear set directly interconnected to the second member of the third planetary gear set by a fifth interconnecting member, the third member of the second planetary gear set assembly includes the third member of the fourth planetary gear set, and the fourth member of the second planetary gear set assembly includes the first member of the third planetary gear set.

In yet another example of the present transmission, the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

In yet another example of the present transmission, the first members of the first, second and third planetary gear sets are sun gears, the second members of the first, third and fourth planetary gear sets are planet carrier members, the second member of the second planetary gear set is a ring gear, the third members of the first and fourth planetary gear sets are ring gears, the third member of the second planetary gear set is a planet carrier member, and the third member of the third planetary gear set and the first member of the fourth planetary gear set combine to form a combination sun/ring gear member.

In yet another example of the present transmission, the first planetary gear set assembly includes a first and a second planetary gear sets each having a first, second, and third members and the second planetary gear set assembly includes a third and a fourth planetary gear sets each having a first, second, and third members. The first member of the first planetary gear set assembly includes the first member of the first planetary gear set directly interconnected to the third member of the second planetary gear set by a second interconnecting member, the second member of the first planetary gear set assembly includes the second member of the first planetary gear set directly interconnected to the second member of the second planetary gear set by a third interconnecting member, the third member of the first planetary gear set assembly includes the third member of the first planetary gear set, and the fourth member of the first planetary gear set assembly includes the first member of the second planetary gear set, and wherein the first member of the second planetary gear set assembly includes the third member of the third planetary gear set directly interconnected to the first member of the fourth planetary gear set by a fourth interconnecting member, the second member of the second planetary gear set assembly includes the second member of the fourth planetary gear set directly interconnected to the second member of the third planetary gear set by a fifth interconnecting member, the third member of the second planetary gear set assembly includes the third member of the fourth planetary gear set, and the fourth member of the second planetary gear set assembly includes the first member of the third planetary gear set.

In yet another example of the present transmission, the first members of the second and third planetary gear sets are sun gears, the second members of the first, second, third, and fourth planetary gear sets are planet carrier members, the third members of the first and fourth planetary gear sets are ring gears, the third member of the second planetary gear set and the first member of the first planetary gear set combine to form a first combination sun/ring gear member, and the third member of the third planetary gear set and the first member of the fourth planetary gear set combine to form a second combination sun/ring gear member.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that in the particular examples provided, the automatic transmissions of the present invention have an arrangement of permanent mechanical connections between the elements of the four planetary gear sets. For example, a first component or element of a first planetary gear set is permanently coupled to a first component or element of a second planetary gear set. A second component or element of the first planetary gear set is permanently coupled to a second component or element of the second planetary gear set. A first component or element of a third planetary gear set is permanently coupled to a first component or element of a fourth planetary gear set. A second component or element of the third planetary gear set is permanently coupled to a second component or element of the fourth planetary gear set. Finally, the first component or element of the second planetary gear set is permanently coupled to a first component or element of the third planetary gear set.

Figure 1:
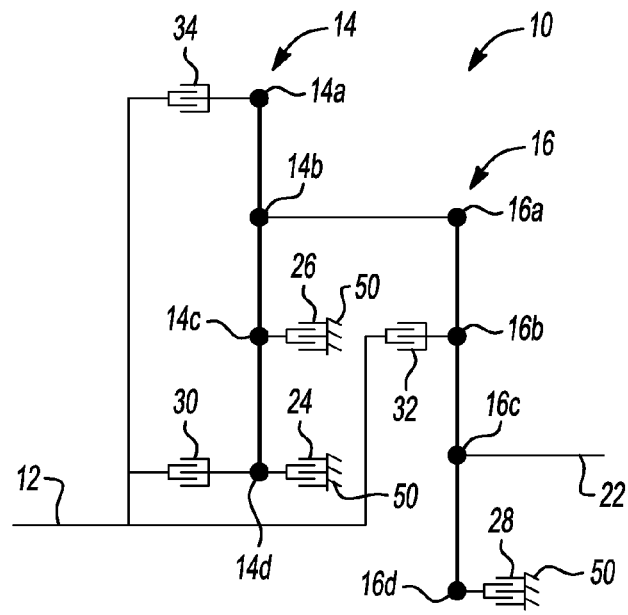
FIG. 1 is a lever diagram of an embodiment of a nine speed transmission according to the present invention.

Referring now to FIG. 1, an example of a nine speed transmission is illustrated in a lever diagram format in accordance with the present invention. A lever diagram is a schematic representation of the components of a mechanical device such as an automatic transmission. In a lever diagram, a single lever may represent a single planetary gear set having three basic mechanical components: a sun gear, a ring gear and a planet carrier member. However, a lever may also represent an assembly of two planetary gear sets or a planetary gear set assembly wherein the three basic mechanical components of the planetary gear set or the shared mechanical components between the two planetary gear sets are each represented by a node. In this case, a single lever contains four nodes. Two of the nodes each represent either a mechanical component that is shared between the two planetary gear sets or a mechanical component of one of the planetary gear sets that is interconnected to a mechanical component of the other planetary gear sets. One of the nodes is the sun gear, ring gear or planet carrier of one of the planetary gear sets. Finally, one of the nodes is the sun gear, ring gear or planet carrier of the other of the planetary gear sets. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting mechanisms such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

With continuing reference to FIG. 1, transmission 10 includes an input shaft or member 12, a first planetary gear set assembly 14 having four nodes: a first node 14A, a second node 14B, a third node 14C and a fourth node 14D, a second planetary gear set assembly 16 having four nodes: a first node 16A, a second node 16B, a third node 16C, and a fourth node 16D and an output shaft or member 22.

In the example of the present invention shown in FIG. 1 the second node 14B of the first planetary gear set assembly 14 is coupled to the first node 16A of the second planetary gear set assembly 16. The third node 16C of the second planetary gear set assembly 16 is coupled to the output shaft or member 22.

The example of the transmission 10 of FIG. 1 includes a first brake 24 selectively connecting the fourth node 14D of the first planetary gear set assembly 14 with a stationary member 50. A second brake 26 selectively connects the third node 14C of the first planetary gear set assembly 14 with the stationary member 50. A third brake 28 selectively connects the fourth node 16D of the second planetary gear set assembly 16 with the stationary member 50. A first clutch 30 selectively connects the fourth node 14D of the first planetary gear set assembly 14 with the input shaft or member 12. A second clutch 32 selectively connects the second node 16B of the second planetary gear set assembly 16 with the input shaft or member 12. A third clutch 34 selectively connects the first node 14A of the first planetary gear set assembly 14 with input shaft or assembly 12.

Figure 2:
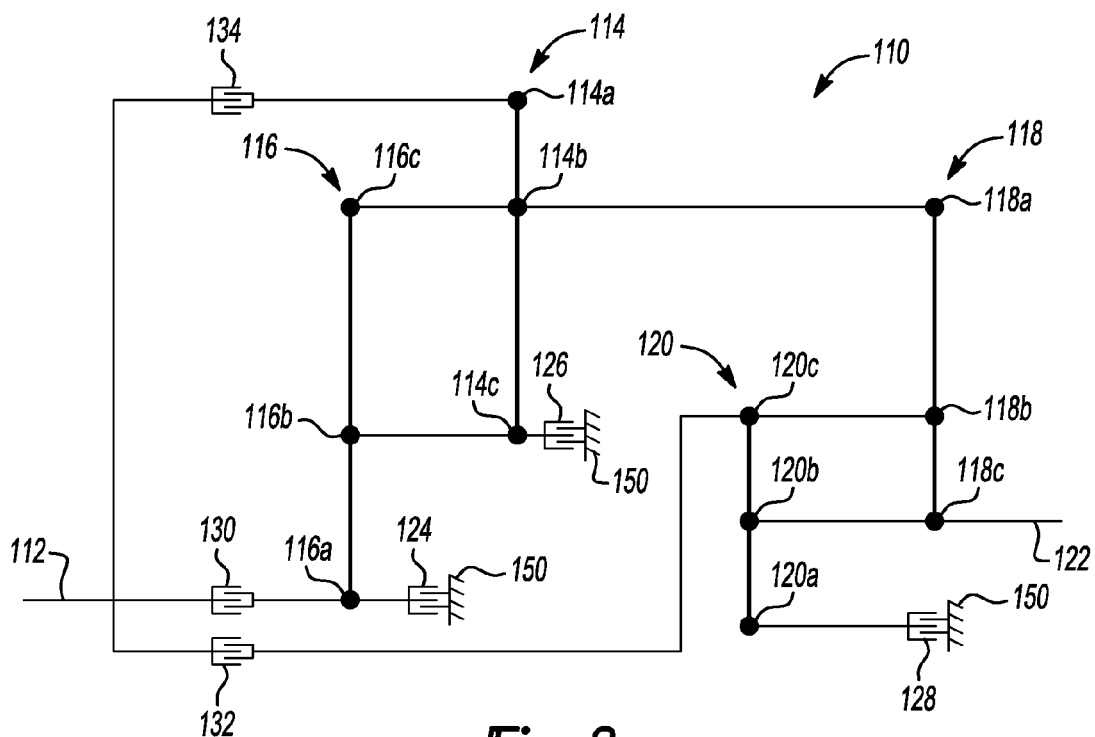
FIG. 2 is a lever diagram of an embodiment of a nine speed transmission according to the present invention.

Referring now to FIG. 2, an example of the nine-speed transmission 110 of the present invention is illustrated in a three-node lever diagram format. The transmission 110 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft or member 122.

The second node 114B of the first planetary gear set 114 is coupled to the third node 116C of the second planetary gear set 116. The third node 114C of the first planetary gear set 114 is coupled to the second node 116B of the second planetary gear set 116. The second node 114B of the first planetary gear set 114 is coupled to the first node 118A of the third planetary gear set 118. The second node 118B of the third planetary gear set 118 is coupled to the third node 120C of the fourth planetary gear set 120. The third node 118C of the third planetary gear set 118 is coupled to the second node 120B of the fourth planetary gear set 120. The output shaft or member 122 is coupled to the third node 118C of the third planetary gear set 118 and the second node 120B of the fourth planetary gear set 120.

The transmission 110 includes six torque transmitting mechanisms 124, 126, 128, 130, 132, 134. The torque transmitting mechanisms 124, 126, 128, 130, 132, 134 are each selectively engageable to interconnect one of the first, second and third nodes of a planetary gear set with a stationary member 150 or the input shaft or member 112. The six torque transmitting mechanisms include three brakes 124, 126, 128 and three clutches 130, 132, 134. A first brake 124 selectively connects the first node 116A of the second planetary gear set 116 with a stationary member 150. A second brake 126 selectively connects the third node 114C of the first planetary gear set 114 and the second node 116B of the second planetary gear set 116 with the stationary member 150. A third brake 128 selectively connects the first node 120A of the fourth planetary gear set 120 with the stationary member 150. A first clutch 130 selectively connects the first node 116A of the second planetary gear set 116 with the input shaft or member 112. A second clutch 132 selectively connects the third node 120C of the fourth planetary gear set 120 with the input shaft or member 112. A third clutch 134 selectively connects the first node 114A of the first planetary gear set 114 with the input shaft or member 112.

Referring now to both FIGS. 1 and 2, the planetary gear assemblies 14, 16 of FIG. 1 represent a pair of planetary gear sets 114, 116, 118, 120 of FIG. 2. For example, the planetary gear set assembly 14 of FIG. 1 represents the first and second planetary gear sets 114, 116 of FIG. 2. The planetary gear set assembly 16 of FIG. 1 represents the third and fourth planetary gear sets 118, 120 of FIG. 2. Further, the first node 14A of the first planetary gear assembly 14 represents the first node 114A of the first planetary gear set 114. The second node 14B of the first planetary gear assembly 14 represents the second node 114B of the first planetary gear set 114 interconnected with the third node 116C of the second planetary gear set 116. The third node 14C of the first planetary gear set assembly 14 represents the third node 114C of the first planetary gear set 114 interconnected with the second node 116B of the second planetary gear set 116. The fourth node 14D of the first planetary gear set assembly 14 represents the first node 116A of the second planetary gear set 116. The first node 16A of the second planetary gear assembly 16 represents the first node 118A of the third planetary gear set 118. The second node 16B of the second planetary gear assembly 16 represents the second node 118B of the third planetary gear set 118 interconnected with the third node 120C of the fourth planetary gear set 120. The third node 16C of the second planetary gear set assembly 16 represents the third node 118C of the third planetary gear set 118 interconnected with the second node 120B of the fourth planetary gear set 120. The fourth node 16D of the second planetary gear set assembly 16 represents the first node 120A of the fourth planetary gear set 120.

Figure 3:
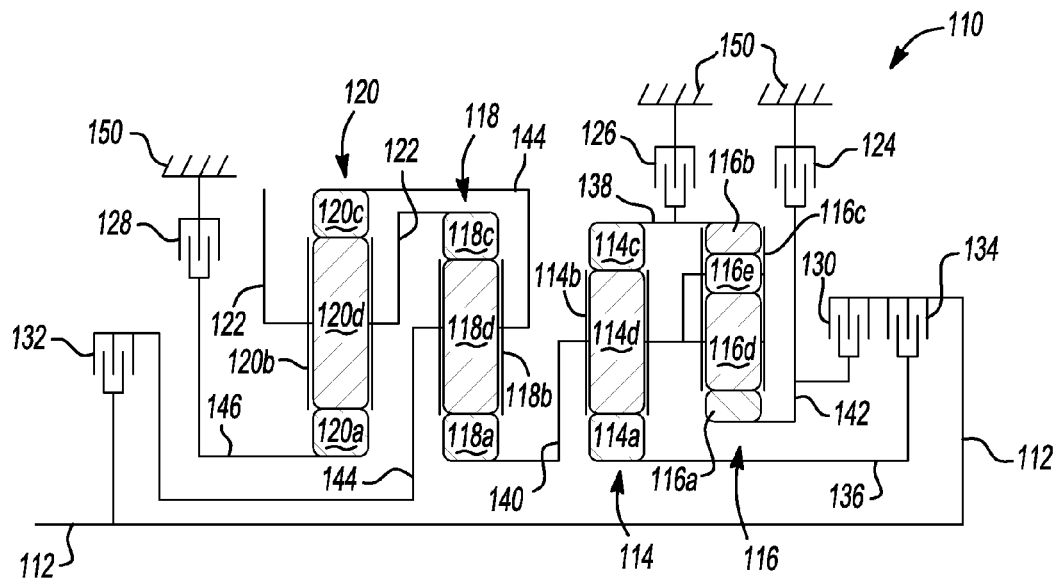
FIG. 3 is a diagrammatic view of an embodiment of a nine speed transmission according to the present invention.

Referring now to FIG. 3, a stick diagram presents a schematic layout of the embodiment of the nine speed transmission 110 according to the present invention. In FIG. 3, the numbering from the lever diagram of FIG. 2 is carried over. The clutches and couplings are correspondingly presented whereas the nodes of the planetary gear sets now appear as components of planetary gear sets such as sun gears, ring gears, planet gears and planet gear carriers.

For example, the planetary gear set 114 of transmissions 110 includes a sun gear member 114A, a ring gear member 114C, and a planet gear carrier member 114B that rotatably supports a set of planet gears 114D (only one of which is shown). The sun gear member 114A is connected for common rotation with a first shaft or interconnecting member 136. The ring gear member 114C is connected for common rotation with a second shaft or interconnecting member 138. The carrier member 114B is connected for common rotation with a third shaft or interconnecting member 140. The planet gears 114D are each configured to intermesh with both of the sun gear member 114A and the ring gear member 114C.

The planetary gear set 116 of transmissions 110 include a sun gear member 116A, a ring gear member 116B, and a planet gear carrier member 116C that rotatably supports a first and second set of planet gears 116D, 116E (only one of each set is shown). The sun gear member 116A is connected for common rotation a fourth shaft or interconnecting member 142. The ring gear member 116B is connected for common rotation with the second shaft or interconnecting member 138. The planet carrier member 116C is connected for common rotation with the third shaft or interconnecting member 140. The first set of planet gears 116D are each configured to intermesh with both of the sun gear member 116A and the second set of planet gears 116E. The second set of planet gears 116E are each configured to intermesh with both of the first set of planet gears 116D and the ring gear member 116B.

The planetary gear set 118 of transmissions 110 include a sun gear member 118A, a ring gear member 118C, and a planet gear carrier member 118B that rotatably supports a set of planet gears 118D (only one of which is shown). The sun gear member 118A is connected for common rotation with the third shaft or interconnecting member 140. The ring gear member 118C is connected for common rotation with the output shaft or member 122. The planet carrier member 118B is connected for common rotation with a fifth shaft or interconnecting member 144. The planet gears 118D are each configured to intermesh with both of the sun gear member 118A and the ring gear member 118C.

The planetary gear set 120 of transmissions 110 include a sun gear member 120A, a ring gear member 120C, and a planet gear carrier member 120B that rotatably supports a set of planet gears 120D (only one of which is shown). The sun gear member 120A is connected for common rotation with a sixth shaft or interconnecting member 146. The ring gear member 120C is connected for common rotation with the fifth shaft or interconnecting member 144. The planet carrier member 120B is connected for common rotation with the output shaft or member 122. The planet gears 120D are each configured to intermesh with both of the sun gear member 120A and the ring gear member 120C.

The input shaft or member 112 is preferably continuously connected to an engine (not shown) or to a turbine of a torque converter (not shown). The output shaft or member 122 is preferably continuously connected with the final drive unit or transfer case (not shown).

The torque transmitting mechanisms or brakes 124, 126, 128 and clutches 130, 132, 134 allow for selective interconnection of the shafts or interconnecting members, members of the planetary gear sets and the housing. For example, a first brake 124 is selectively engageable to interconnect the fourth shaft or interconnecting member 142 with the stationary member or transmission housing 150. A second brake 126 is selectively engageable to interconnect the second shaft or interconnecting member 138 with the stationary member or transmission housing 150. A third brake 128 is selectively engageable to interconnect the sixth shaft or interconnecting member 146 with the stationary member or transmission housing 150. A first clutch 130 is selectively engageable to interconnect the fourth shaft or interconnecting member 142 with the input shaft or member 112. A second clutch 132 is selectively engageable to interconnect the fifth shaft or interconnecting member 144 with the input shaft or member 112. The third clutch 134 is selectively engageable to interconnect the first shaft or interconnecting member 136 with the input shaft or member 112.

Figure 4:
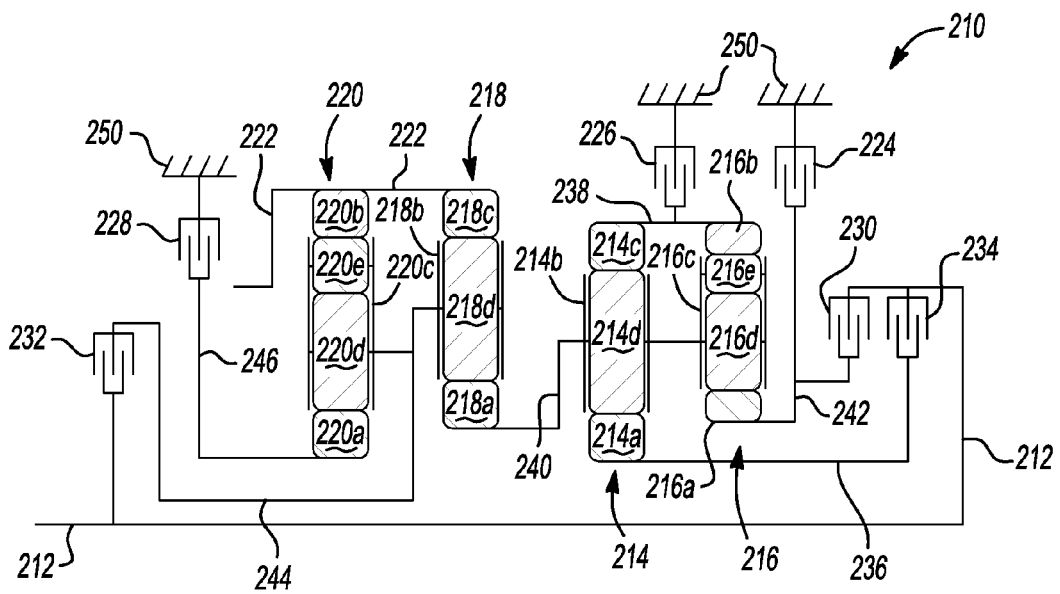
FIG. 4 is a diagrammatic view of an embodiment of a nine speed transmission according to the present invention.

Referring now to FIG. 4, a stick diagram presents a schematic layout of the embodiment of the nine speed transmission 210 according to the present invention. The clutches and couplings are correspondingly presented whereas the nodes of the planetary gear sets now appear as components of planetary gear sets such as sun gears, ring gears, planet gears and planet gear carriers.

For example, the planetary gear set 214 of transmissions 210 includes a sun gear member 214A, a ring gear member 214C, and a planet gear carrier member 214B that rotatably supports a set of planet gears 214D (only one of which is shown). The sun gear member 214A is connected for common rotation with a first shaft or interconnecting member 236. The ring gear member 214C is connected for common rotation with a second shaft or interconnecting member 238. The carrier member 214B is connected for common rotation with a third shaft or interconnecting member 240. The planet gears 214D are each configured to intermesh with both of the sun gear member 214A and the ring gear member 214C.

The planetary gear set 216 of transmissions 210 include a sun gear member 216A, a ring gear member 216B, and a planet gear carrier member 216C that rotatably supports a first and second set of planet gears 216D, 216E (only one of each set is shown). The sun gear member 216A is connected for common rotation a fourth shaft or interconnecting member 242. The ring gear member 216B is connected for common rotation with the second shaft or interconnecting member 238. The planet carrier member 216C is connected for common rotation with the third shaft or interconnecting member 240. The first set of planet gears 216D are each configured to intermesh with both of the sun gear member 216A and the second set of planet gears 216E. The second set of planet gears 216E are each configured to intermesh with both of the first set of planet gears 216D and the ring gear member 216B.

The planetary gear set 218 of transmissions 110 include a sun gear member 218A, a ring gear member 218C, and a planet gear carrier member 218B that rotatably supports a set of planet gears 218D (only one of which is shown). The sun gear member 218A is connected for common rotation with the third shaft or interconnecting member 240. The ring gear member 218C is connected for common rotation with the output shaft or member 222. The planet carrier member 218B is connected for common rotation with a fifth shaft or interconnecting member 244. The planet gears 218D are each configured to intermesh with both of the sun gear member 218A and the ring gear member 218C.

The planetary gear set 220 of transmissions 210 include a sun gear member 220A, a ring gear member 220B, and a planet gear carrier member 220C that rotatably supports a first and second set of planet gears 220D, 220E (only one of each set is shown). The sun gear member 220A is connected for common rotation with a sixth shaft or interconnecting member 246. The ring gear member 220B is connected for common rotation with the output shaft or member 222. The planet carrier member 220C is connected for common rotation with the fifth shaft or interconnecting member 244. The first set of planet gears 220D are each configured to intermesh with both of the sun gear member 220A and the second set of planet gears 220E. The second set of planet gears 220E are each configured to intermesh with both of the first set of planet gears 220D and the ring gear member 220B.

The input shaft or member 212 is preferably continuously connected to an engine (not shown) or to a turbine of a torque converter (not shown). The output shaft or member 222 is preferably continuously connected with the final drive unit or transfer case (not shown).

The torque transmitting mechanisms or brakes 224, 226, 228 and clutches 230, 232, 234 allow for selective interconnection of the shafts or interconnecting members, members of the planetary gear sets and the housing. For example, a first brake 224 is selectively engageable to interconnect the fourth shaft or interconnecting member 242 with the stationary member or transmission housing 250. A second brake 226 is selectively engageable to interconnect the second shaft or interconnecting member 238 with the stationary member or transmission housing 250. A third brake 228 is selectively engageable to interconnect the sixth shaft or interconnecting member 246 with the stationary member or transmission housing 250. A first clutch 230 is selectively engageable to interconnect the fourth shaft or interconnecting member 242 with the input shaft or member 222. A second clutch 232 is selectively engageable to interconnect the fifth shaft or interconnecting member 244 with the input shaft or member 222. The third clutch 234 is selectively engageable to interconnect the first shaft or interconnecting member 236 with the input shaft or member 222.

Figures 11, 12:
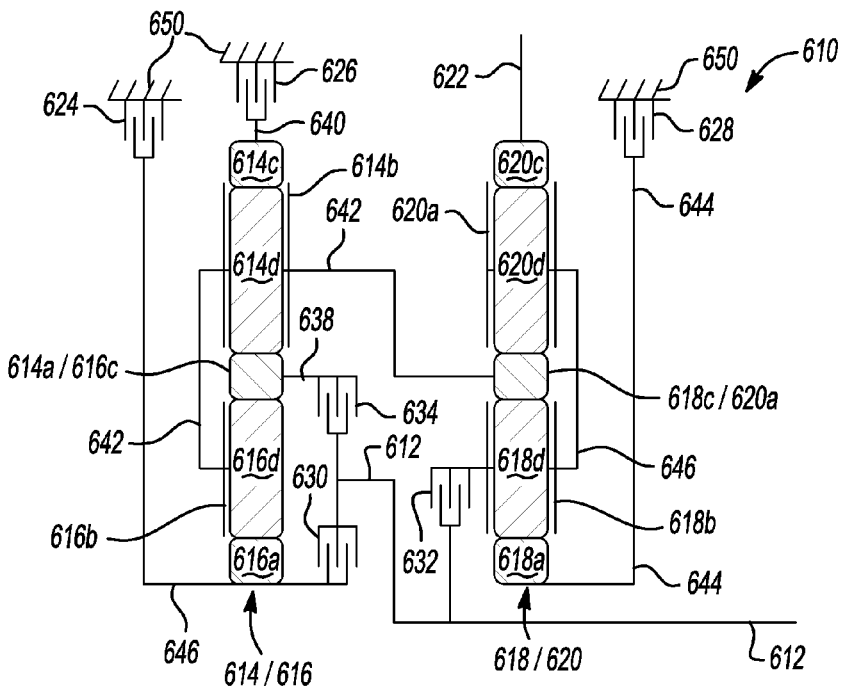
FIG. 11 is a diagrammatic view of an embodiment of a nine speed transmission according to the present invention.
FIG. 12 is a truth table presenting the state of engagement of the various torque transmitting mechanisms in each of the available forward and reverse speeds or gear ratios of the transmission illustrated in FIGS. 1-11.

Referring now to FIGS. 2-4 and 12, the operation of the embodiment of the nine speed transmissions 110, 210 will be described. It will be appreciated that the transmissions 110, 210 are capable of transmitting torque from the input shaft or member 112, 212 to the output shaft or member 122, 222 in at least nine forward speed or torque ratios and at least one reverse speed or torque ratio with a triple overdrive. Each forward and reverse speed or torque ratio is attained by engagement of one or more of the torque transmitting mechanisms (i.e. first brake 124, 224, second brake 126, 226, third brake 128, 228, first clutch 130, 230, second clutch 132, 232, and third clutch 134, 234), as will be explained below. FIG. 12 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the second brake 126, 226, the third brake 128, 228, and the first clutch 130, 230 are engaged or activated. The second brake 126, 226 connects the second shaft or interconnecting member 138, 238 with the stationary member or transmission housing 150, 250 in order to prevent the second shaft or interconnecting member 138, 238 and therefore the ring gear member 114C, 214C of the first planetary gear set 114, 214 and the ring gear member 116B, 216B of the second planetary gear set 116, 216 from rotating relative to the transmission housing 150, 250. The third brake 128, 228 connects the sixth shaft or interconnecting member 146, 246 with the stationary member or transmission housing 150, 250 in order to prevent the sixth shaft or interconnecting member 146, 246 and therefore the sun gear member 120A, 220A of the fourth planetary gear set 120, 220 from rotating relative to the transmission housing 150, 250. The first clutch 130, 230 connects the fourth shaft or interconnecting member 142, 242 with the input shaft or member 112, 212 in order to provide common rotation between the sun gear member 116A, 216A and the input shaft or member 112, 212. Likewise, the nine forward ratios are achieved through different combinations of clutch and brake engagement, as shown in FIG. 12.

It will be appreciated that the foregoing explanation of operation and gear states of the nine speed transmissions 110, 210 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 5:
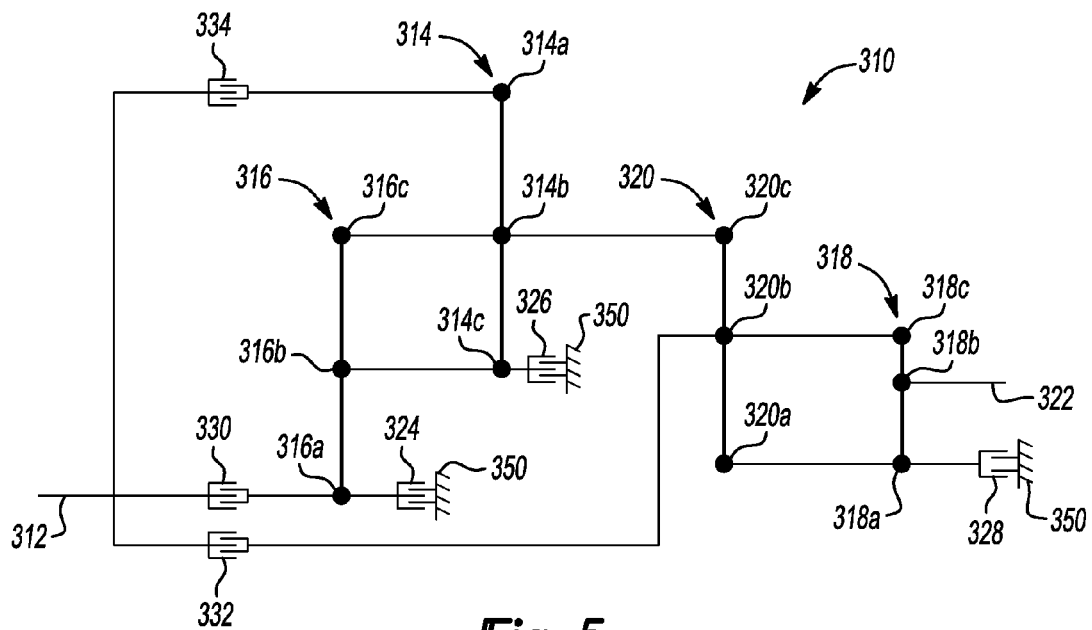
FIG. 5 is a lever diagram of an embodiment of a nine speed transmission according to the present invention.

Referring now to FIG. 5, an example of the nine-speed transmission 310 of the present invention is illustrated in a three-node lever diagram format. The transmission 310 includes an input shaft or member 312, a first planetary gear set 314 having three nodes: a first node 314A, a second node 314B and a third node 314C, a second planetary gear set 316 having three nodes: a first node 316A, a second node 316B and a third node 316C, a third planetary gear set 318 having three nodes: a first node 318A, a second node 318B and a third node 318C, a fourth planetary gear set 320 having three nodes: a first node 320A, a second node 320B and a third node 320C and an output shaft or member 322.

The second node 314B of the first planetary gear set 314 is coupled to the third node 316C of the second planetary gear set 316. The third node 314C of the first planetary gear set 314 is coupled to the second node 316B of the second planetary gear set 316. The second node 314B of the first planetary gear set 314 is coupled to the third node 320C of the fourth planetary gear set 320. The first node 318A of the third planetary gear set 318 is coupled to the first node 320A of the fourth planetary gear set 320. The third node 318C of the third planetary gear set 318 is coupled to the second node 320B of the fourth planetary gear set 320. The output shaft or member 322 is coupled to the second node 318B of the third planetary gear set 318.

The transmission 310 includes six torque transmitting mechanisms 324, 326, 328, 330, 332, 334. The torque transmitting mechanisms 324, 326, 328, 330, 332, 334 are each selectively engageable to interconnect one of the first, second and third nodes of a planetary gear set with a stationary member 350 or the input shaft or member 312. The six torque transmitting mechanisms include three brakes 324, 326, 328 and three clutches 330, 332, 334. A first brake 324 selectively connects the first node 316A of the second planetary gear set 316 with a stationary member 350. A second brake 326 selectively connects the third node 314C of the first planetary gear set 314 and the second node 316B of the second planetary gear set 316 with the stationary member 350. A third brake 328 selectively connects the first node 318A of the third planetary gear set 318 and the first node 320A of the fourth planetary gear set 320 with the stationary member 350. A first clutch 330 selectively connects the first node 316A of the second planetary gear set 316 with the input shaft or member 312. A second clutch 332 selectively connects the third node 318C of the third planetary gear set 318 and the second node 320B of the fourth planetary gear set 320 with the input shaft or member 312. A third clutch 334 selectively connects the first node 314A of the first planetary gear set 314 with the input shaft or member 312.

Referring now to both FIGS. 1 and 5, the planetary gear assemblies 14, 16 of FIG. 1 represent a pair of planetary gear sets 314, 316, 318, 320 of FIG. 5. For example, the planetary gear set assembly 14 of FIG. 1 represents the first and second planetary gear sets 314, 316 of FIG. 5. The planetary gear set assembly 16 of FIG. 1 represents the third and fourth planetary gear sets 318, 320 of FIG. 5. Further, the first node 14A of the first planetary gear assembly 14 represents the first node 314A of the first planetary gear set 314. The second node 14B of the first planetary gear assembly 14 represents the second node 314B of the first planetary gear set 314 interconnected with the third node 316C of the second planetary gear set 316. The third node 14C of the first planetary gear set assembly 14 represents the third node 314C of the first planetary gear set 314 interconnected with the second node 316B of the second planetary gear set 316. The fourth node 14D of the first planetary gear set assembly 14 represents the first node 316A of the second planetary gear set 316. The first node 16A of the second planetary gear assembly 16 represents the third node 320C of the fourth planetary gear set 320. The second node 16B of the second planetary gear assembly 16 represents the second node 320B of the fourth planetary gear set 320 interconnected with the third node 318C of the third planetary gear set 318. The third node 16C of the second planetary gear set assembly 16 represents the second node 318B of the third planetary gear set 318. The fourth node 16D of the second planetary gear set assembly 16 represents the first node 320A of the fourth planetary gear set 320 interconnected with the first node 318A of the third planetary gear set.

Figure 6:
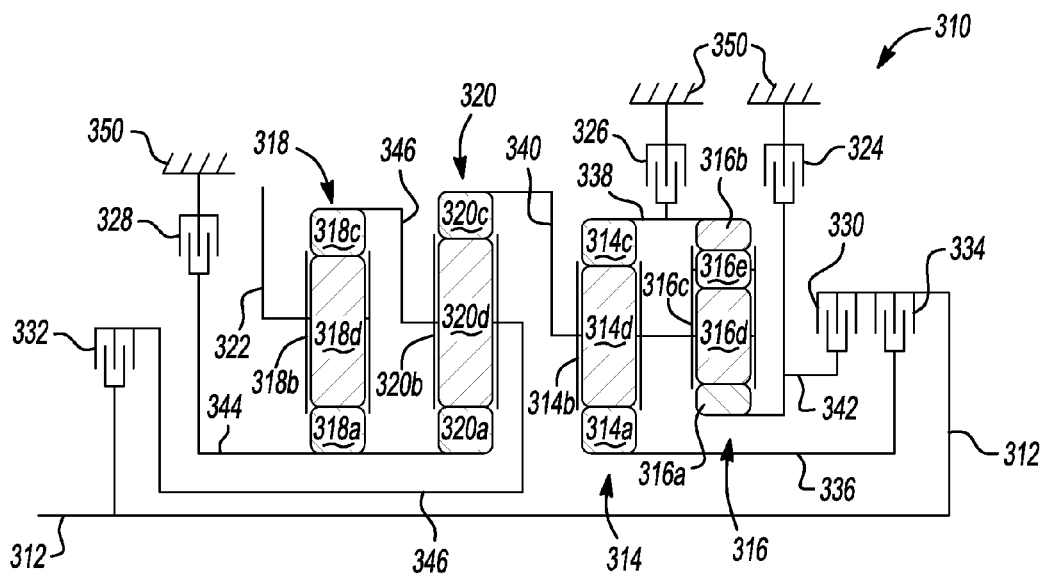
FIG. 6 is a diagrammatic view of an embodiment of a nine speed transmission according to the present invention.

Referring now to FIG. 6, a stick diagram presents a schematic layout of the embodiment of the nine speed transmission 310 according to the present invention. In FIG. 6, the numbering from the lever diagram of FIG. 5 is carried over. The clutches and couplings are correspondingly presented whereas the nodes of the planetary gear sets now appear as components of planetary gear sets such as sun gears, ring gears, planet gears and planet gear carriers.

For example, the planetary gear set 314 of transmission 310 includes a sun gear member 314A, a ring gear member 314C, and a planet gear carrier member 314B that rotatably supports a set of planet gears 314D (only one of which is shown). The sun gear member 314A is connected for common rotation with a first shaft or interconnecting member 336. The ring gear member 314C is connected for common rotation with a second shaft or interconnecting member 338. The carrier member 314B is connected for common rotation with a third shaft or interconnecting member 340. The planet gears 314D are each configured to intermesh with both of the sun gear member 314A and the ring gear member 314C.

The planetary gear set 316 of transmission 310 include a sun gear member 316A, a ring gear member 316B, and a planet gear carrier member 316C that rotatably supports a first and second set of planet gears 316D, 316E (only one of each set is shown). The sun gear member 316A is connected for common rotation a fourth shaft or interconnecting member 342. The ring gear member 316B is connected for common rotation with the second shaft or interconnecting member 338. The planet carrier member 316C is connected for common rotation with the third shaft or interconnecting member 340. The first set of planet gears 316D are each configured to intermesh with both of the sun gear member 316A and the second set of planet gears 316E. The second set of planet gears 316E are each configured to intermesh with both of the first set of planet gears 316D and the ring gear member 316B.

The planetary gear set 318 of transmission 310 include a sun gear member 318A, a ring gear member 318C, and a planet gear carrier member 318B that rotatably supports a set of planet gears 318D (only one of which is shown). The sun gear member 318A is connected for common rotation with a fifth shaft or interconnecting member 344. The ring gear member 318C is connected for common rotation with a sixth shaft or interconnecting member 346. The planet carrier member 318B is connected for common rotation with the output shaft or member 322. The planet gears 318D are each configured to intermesh with both of the sun gear member 318A and the ring gear member 318C.

The planetary gear set 320 of transmission 310 include a sun gear member 320A, a ring gear member 320C, and a planet gear carrier member 320B that rotatably supports a set of planet gears 320D (only one of which is shown). The sun gear member 320A is connected for common rotation with the fifth shaft or interconnecting member 344. The ring gear member 320C is connected for common rotation with the third shaft or interconnecting member 340. The planet carrier member 320B is connected for common rotation with the sixth shaft or interconnecting member 346. The planet gears 320D are each configured to intermesh with both of the sun gear member 320A and the ring gear member 320C.

The input shaft or member 312 is preferably continuously connected to an engine (not shown) or to a turbine of a torque converter (not shown). The output shaft or member 322 is preferably continuously connected with the final drive unit or transfer case (not shown).

The torque transmitting mechanisms or brakes 324, 326, 328 and clutches 330, 332, 334 allow for selective interconnection of the shafts or interconnecting members, members of the planetary gear sets and the housing. For example, a first brake 324 is selectively engageable to interconnect the fourth shaft or interconnecting member 342 with the stationary member or transmission housing 350. A second brake 326 is selectively engageable to interconnect the second shaft or interconnecting member 338 with the stationary member or transmission housing 350. A third brake 328 is selectively engageable to interconnect the fifth shaft or interconnecting member 344 with the stationary member or transmission housing 350. A first clutch 330 is selectively engageable to interconnect the fourth shaft or interconnecting member 342 with the input shaft or member 312. A second clutch 332 is selectively engageable to interconnect the sixth shaft or interconnecting member 346 with the input shaft or member 312. The third clutch 334 is selectively engageable to interconnect the first shaft or interconnecting member 336 with the input shaft or member 312.

Referring now to FIGS. 5, 6 and 12, the operation of the embodiment of the nine speed transmission 310 will be described. It will be appreciated that the transmission 310 are capable of transmitting torque from the input shaft or member 312 to the output shaft or member 322 in at least nine forward speed or torque ratios and at least one reverse speed or torque ratio with a triple overdrive. Each forward and reverse speed or torque ratio is attained by engagement of one or more of the torque transmitting mechanisms (i.e. first brake 324, second brake 326, third brake 328, first clutch 330, second clutch 332, and third clutch 334), as will be explained below. FIG. 12 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the second brake 326, the third brake 328, and the first clutch 330 are engaged or activated. The second brake 326 connects the second shaft or interconnecting member 338 with the stationary member or transmission housing 350 in order to prevent the second shaft or interconnecting member 338 and therefore the ring gear member 314C of the first planetary gear set 314 and the ring gear member 316B of the second planetary gear set 316 from rotating relative to the transmission housing 350. The third brake 328 connects the fifth shaft or interconnecting member 344 with the stationary member or transmission housing 350 in order to prevent the fifth shaft or interconnecting member 344 and therefore the sun gear member 318A of the third planetary gear set 318 and the sun gear member 320A of the fourth planetary gear set 320 from rotating relative to the transmission housing 350. The first clutch 330 connects the fourth shaft or interconnecting member 342 with the input shaft or member 312 in order to provide common rotation between the sun gear member 316A and the input shaft or member 312. Likewise, the nine forward ratios are achieved through different combinations of clutch and brake engagement, as shown in FIG. 12.

It will be appreciated that the foregoing explanation of operation and gear states of the nine speed transmission 310 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 7:
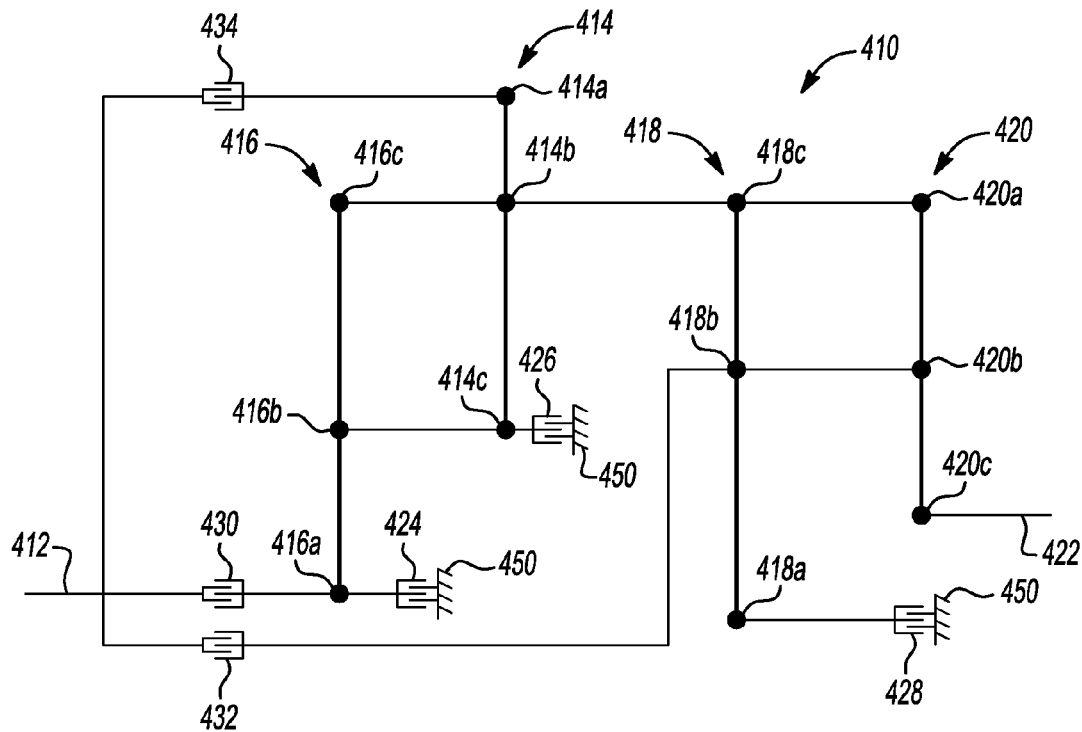
FIG. 7 is a lever diagram of an embodiment of a nine speed transmission according to the present invention.

Referring now to FIG. 7, an example of the nine-speed transmission 410 of the present invention is illustrated in a three-node lever diagram format. The transmission 410 includes an input shaft or member 412, a first planetary gear set 414 having three nodes: a first node 414A, a second node 414B and a third node 414C, a second planetary gear set 416 having three nodes: a first node 416A, a second node 416B and a third node 416C, a third planetary gear set 418 having three nodes: a first node 418A, a second node 418B and a third node 418C, a fourth planetary gear set 420 having three nodes: a first node 420A, a second node 420B and a third node 420C and an output shaft or member 422.

The second node 414B of the first planetary gear set 414 is coupled to the third node 416C of the second planetary gear set 416. The third node 414C of the first planetary gear set 414 is coupled to the second node 416B of the second planetary gear set 416. The second node 414B of the first planetary gear set 414 is coupled to the third node 418C of the third planetary gear set 418 and the first node 420A of the fourth planetary gear set 420. The second node 418B of the third planetary gear set 418 is coupled to the second node 420B of the fourth planetary gear set 420. The third node 420C of the fourth planetary gear set 420 is coupled to the output shaft or member 422.

The transmission 410 includes six torque transmitting mechanisms 424, 426, 428, 430, 432, 434. The torque transmitting mechanisms 424, 426, 428, 430, 432, 434 are each selectively engageable to interconnect one of the first, second and third nodes of a planetary gear set with a stationary member 450 or the input shaft or member 412. The six torque transmitting mechanisms include three brakes 424, 426, 428 and three clutches 430, 432, 434. A first brake 424 selectively connects the first node 416A of the second planetary gear set 416 with a stationary member 450. A second brake 426 selectively connects the third node 414C of the first planetary gear set 414 and the second node 416B of the second planetary gear set 416 with the stationary member 450. A third brake 428 selectively connects the first node 418A of the third planetary gear set 418 with the stationary member 450. A first clutch 430 selectively connects the first node 416A of the second planetary gear set 416 with the input shaft or member 412. A second clutch 432 selectively connects the second node 418B of the third planetary gear set 418 and the second node 420B of the fourth planetary gear set 420 with the input shaft or member 412. A third clutch 434 selectively connects the first node 414A of the first planetary gear set 414 with the input shaft or member 412.

Referring now to both FIGS. 1 and 7, the planetary gear assemblies 14, 16 of FIG. 1 represent a pair of planetary gear sets 414, 416, 418, 420 of FIG. 5. For example, the planetary gear set assembly 14 of FIG. 1 represents the first and second planetary gear sets 414, 416 of FIG. 7. The planetary gear set assembly 16 of FIG. 1 represents the third and fourth planetary gear sets 418, 420 of FIG. 7. Further, the first node 14A of the first planetary gear assembly 14 represents the first node 414A of the first planetary gear set 414. The second node 14B of the first planetary gear assembly 14 represents the second node 414B of the first planetary gear set 414 interconnected with the third node 416C of the second planetary gear set 416. The third node 14C of the first planetary gear set assembly 14 represents the third node 414C of the first planetary gear set 414 interconnected with the second node 416B of the second planetary gear set 416. The fourth node 14D of the first planetary gear set assembly 14 represents the first node 416A of the second planetary gear set 416. The first node 16A of the second planetary gear assembly 16 represents the third node 418C of the third planetary gear set 418 interconnected with the first node 420A of the fourth planetary gear set 420. The second node 16B of the second planetary gear assembly 16 represents the second node 418B of the third planetary gear set 418 interconnected with the second node 420B of the fourth planetary gear set 420. The third node 16C of the second planetary gear set assembly 16 represents the third node 420C of the fourth planetary gear set 420. The fourth node 16D of the second planetary gear set assembly 16 represents the first node 418A of the third planetary gear set 418.

Figure 8:
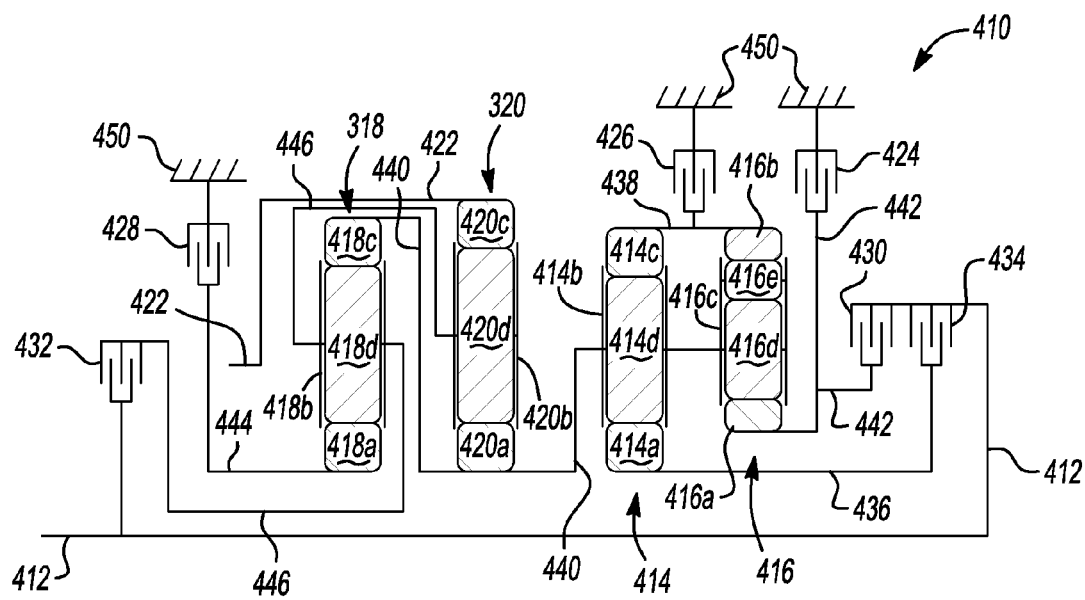
FIG. 8 is a diagrammatic view of an embodiment of a nine speed transmission according to the present invention.

Referring now to FIG. 8, a stick diagram presents a schematic layout of the embodiment of the nine speed transmission 410 according to the present invention. In FIG. 8, the numbering from the lever diagram of FIG. 7 is carried over. The clutches and couplings are correspondingly presented whereas the nodes of the planetary gear sets now appear as components of planetary gear sets such as sun gears, ring gears, planet gears and planet gear carriers.

For example, the planetary gear set 414 of transmission 410 includes a sun gear member 414A, a ring gear member 414C, and a planet gear carrier member 414B that rotatably supports a set of planet gears 414D (only one of which is shown). The sun gear member 414A is connected for common rotation with a first shaft or interconnecting member 436. The ring gear member 414C is connected for common rotation with a second shaft or interconnecting member 438. The carrier member 414B is connected for common rotation with a third shaft or interconnecting member 440. The planet gears 414D are each configured to intermesh with both of the sun gear member 414A and the ring gear member 414C.

The planetary gear set 416 of transmission 410 include a sun gear member 416A, a ring gear member 416B, and a planet gear carrier member 416C that rotatably supports a first and second set of planet gears 416D, 416E (only one of each set is shown). The sun gear member 416A is connected for common rotation a fourth shaft or interconnecting member 442. The ring gear member 416B is connected for common rotation with the second shaft or interconnecting member 438. The planet carrier member 416C is connected for common rotation with the third shaft or interconnecting member 440. The first set of planet gears 416D are each configured to intermesh with both of the sun gear member 416A and the second set of planet gears 416E. The second set of planet gears 416E are each configured to intermesh with both of the first set of planet gears 416D and the ring gear member 416B.

The planetary gear set 418 of transmission 410 include a sun gear member 418A, a ring gear member 418C, and a planet gear carrier member 418B that rotatably supports a set of planet gears 418D (only one of which is shown). The sun gear member 418A is connected for common rotation with a fifth shaft or interconnecting member 444. The ring gear member 418C is connected for common rotation with a third shaft or interconnecting member 440. The planet carrier member 418B is connected for common rotation with a sixth shaft or interconnecting member 446. The planet gears 418D are each configured to intermesh with both of the sun gear member 418A and the ring gear member 418C.

The planetary gear set 420 of transmission 410 include a sun gear member 420A, a ring gear member 420C, and a planet gear carrier member 420B that rotatably supports a set of planet gears 420D (only one of which is shown). The sun gear member 420A is connected for common rotation with the third shaft or interconnecting member 440. The ring gear member 420C is connected for common rotation with the output shaft or member 422. The planet carrier member 420B is connected for common rotation with the sixth shaft or interconnecting member 446. The planet gears 420D are each configured to intermesh with both of the sun gear member 420A and the ring gear member 420C.

The input shaft or member 412 is preferably continuously connected to an engine (not shown) or to a turbine of a torque converter (not shown). The output shaft or member 422 is preferably continuously connected with the final drive unit or transfer case (not shown).

The torque transmitting mechanisms or brakes 424, 426, 428 and clutches 430, 432, 434 allow for selective interconnection of the shafts or interconnecting members, members of the planetary gear sets and the housing. For example, a first brake 424 is selectively engageable to interconnect the fourth shaft or interconnecting member 442 with the stationary member or transmission housing 450. A second brake 426 is selectively engageable to interconnect the second shaft or interconnecting member 438 with the stationary member or transmission housing 450. A third brake 428 is selectively engageable to interconnect the fifth shaft or interconnecting member 444 with the stationary member or transmission housing 450. A first clutch 430 is selectively engageable to interconnect the fourth shaft or interconnecting member 442 with the input shaft or member 412. A second clutch 432 is selectively engageable to interconnect the sixth shaft or interconnecting member 446 with the input shaft or member 412. The third clutch 434 is selectively engageable to interconnect the first shaft or interconnecting member 436 with the input shaft or member 412.

Figure 9:
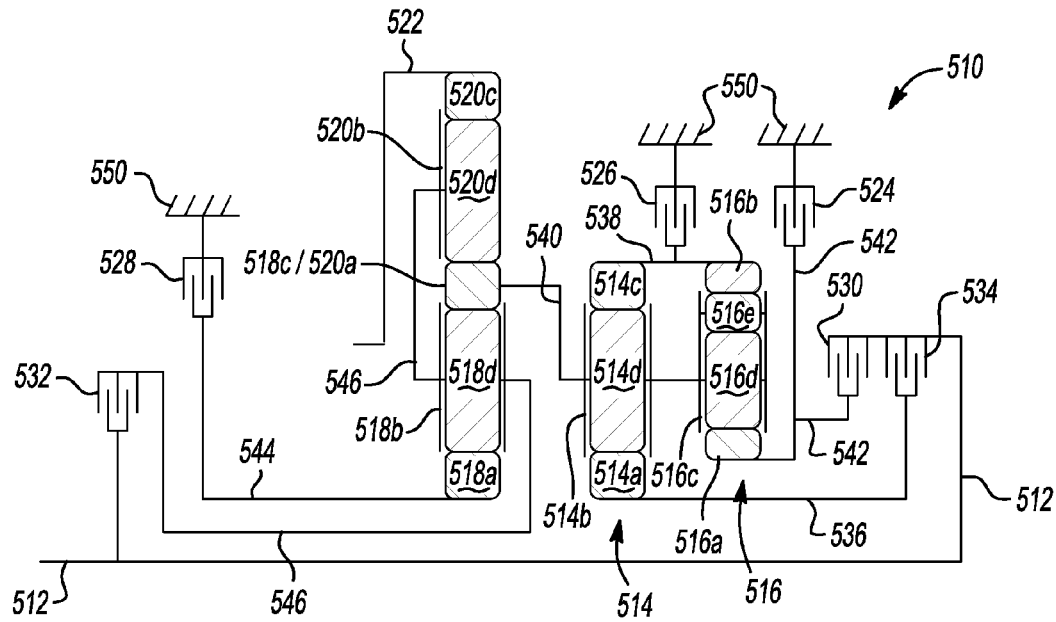
FIG. 9 is a diagrammatic view of an embodiment of a nine speed transmission according to the present invention.

Referring now to FIG. 9, a stick diagram presents a schematic layout of the embodiment of the nine speed transmission 510 according to the present invention. The clutches and couplings are correspondingly presented whereas the nodes of the planetary gear sets now appear as components of planetary gear sets such as sun gears, ring gears, planet gears and planet gear carriers.

For example, the first planetary gear set 514 of transmission 510 includes a sun gear member 514A, a ring gear member 514C, and a planet gear carrier member 514B that rotatably supports a set of planet gears 514D (only one of which is shown). The sun gear member 514A is connected for common rotation with a first shaft or interconnecting member 536. The ring gear member 514C is connected for common rotation with a second shaft or interconnecting member 538. The carrier member 514B is connected for common rotation with a third shaft or interconnecting member 540. The planet gears 514D are each configured to intermesh with both of the sun gear member 514A and the ring gear member 514C.

The planetary gear set 516 of transmission 510 include a sun gear member 516A, a ring gear member 516B, and a planet gear carrier member 516C that rotatably supports a first and second set of planet gears 516D, 516E (only one of each set is shown). The sun gear member 516A is connected for common rotation a fourth shaft or interconnecting member 452. The ring gear member 516B is connected for common rotation with the second shaft or interconnecting member 538. The planet carrier member 516C is connected for common rotation with the third shaft or interconnecting member 540. The first set of planet gears 516D are each configured to intermesh with both of the sun gear member 516A and the second set of planet gears 516E. The second set of planet gears 516E are each configured to intermesh with both of the first set of planet gears 516D and the ring gear member 516B.

The planetary gear set assembly 518/520 is a pair of stacked planetary gear sets that share a sun/ring combination gear member. The planetary gear set assembly 518/520 includes a sun gear member 518A, a sun/ring combination gear member 518C/520A, a ring gear member 520C, a first planet gear carrier member 518B that rotatably supports a set of planet gears 518D (only one of which is shown), and a second planet gear carrier member 520B that rotatably supports a set of planet gears 520D (only one of which is shown). The sun gear member 518A is connected for common rotation with a fifth shaft or interconnecting member 544. The sun/ring combination gear member 518C/520A is connected for common rotation with a third shaft or interconnecting member 540. The ring gear member 520C is connected for common rotation with the output shaft or member 522. The first planet carrier member 518B is connected for common rotation with a sixth shaft or interconnecting member 546. The second planet carrier member 520B is connected for common rotation with the sixth shaft or interconnecting member 546. The planet gears 518D are each configured to intermesh with both of the sun gear member 518A and the sun/ring combination gear member 518C/520A. The planet gears 520D are each configured to intermesh with both of the sun/ring combination gear member 518C/520A and the ring gear member 520C.

The input shaft or member 512 is preferably continuously connected to an engine (not shown) or to a turbine of a torque converter (not shown). The output shaft or member 522 is preferably continuously connected with the final drive unit or transfer case (not shown).

The torque transmitting mechanisms or brakes 524, 526, 528 and clutches 530, 532, 534 allow for selective interconnection of the shafts or interconnecting members, members of the planetary gear sets and the housing. For example, a first brake 524 is selectively engageable to interconnect the fourth shaft or interconnecting member 542 with the stationary member or transmission housing 550. A second brake 526 is selectively engageable to interconnect the second shaft or interconnecting member 538 with the stationary member or transmission housing 550. A third brake 528 is selectively engageable to interconnect the fifth shaft or interconnecting member 544 with the stationary member or transmission housing 550. A first clutch 530 is selectively engageable to interconnect the fourth shaft or interconnecting member 542 with the input shaft or member 512. A second clutch 532 is selectively engageable to interconnect the sixth shaft or interconnecting member 546 with the input shaft or member 512. The third clutch 534 is selectively engageable to interconnect the first shaft or interconnecting member 536 with the input shaft or member 512.

Referring now to FIGS. 7, 8, 9 and 12, the operation of the embodiment of the nine speed transmissions 510 will be described. It will be appreciated that the transmissions 510 are capable of transmitting torque from the input shaft or member 512 to the output shaft or member 522 in at least nine forward speed or torque ratios and at least one reverse speed or torque ratio with a triple overdrive. Each forward and reverse speed or torque ratio is attained by engagement of one or more of the torque transmitting mechanisms (i.e. first brake 524, second brake 526, third brake 528, first clutch 530, second clutch 532, and third clutch 534), as will be explained below. FIG. 12 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the second brake 526, the third brake 528, and the first clutch 530 are engaged or activated. The second brake 526 connects the second shaft or interconnecting member 538 with the stationary member or transmission housing 550 in order to prevent the second shaft or interconnecting member 538 and therefore the ring gear member 514C of the first planetary gear set 514 and the ring gear member 516B of the second planetary gear set 516 from rotating relative to the transmission housing 550. The third brake 528 connects the fifth shaft or interconnecting member 544 with the stationary member or transmission housing 550 in order to prevent the fifth shaft or interconnecting member 544 and therefore the sun gear member 518A of the third planetary gear set 518 (FIG. 8) or the planetary gear set assembly 518/520 (FIG. 9) from rotating relative to the transmission housing 550. The first clutch 530 connects the fourth shaft or interconnecting member 542 with the input shaft or member 512 in order to provide common rotation between the sun gear member 516A of the second planetary gear set 516 and the input shaft or member 512. Likewise, the nine forward ratios are achieved through different combinations of clutch and brake engagement, as shown in FIG. 12.

It will be appreciated that the foregoing explanation of operation and gear states of the nine speed transmission 510 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 10:
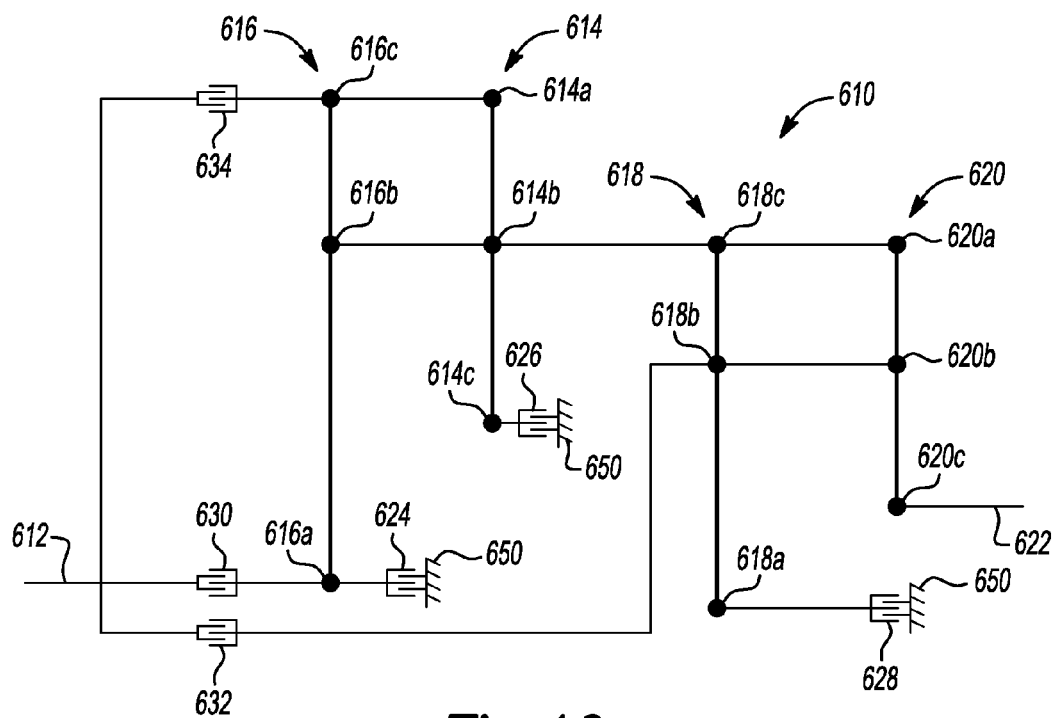
FIG. 10 is a lever diagram of an embodiment of a nine speed transmission according to the present invention.

Referring now to FIG. 10, an example of the nine-speed transmission 610 of the present invention is illustrated in a three-node lever diagram format. The transmission 610 includes an input shaft or member 612, a first planetary gear set 614 having three nodes: a first node 614A, a second node 614B and a third node 614C, a second planetary gear set 616 having three nodes: a first node 616A, a second node 616B and a third node 616C, a third planetary gear set 618 having three nodes: a first node 618A, a second node 618B and a third node 618C, a fourth planetary gear set 620 having three nodes: a first node 620A, a second node 620B and a third node 620C and an output shaft or member 622.

The first node 614A of the first planetary gear set 614 is coupled to the third node 616C of the second planetary gear set 616. The second node 614B of the first planetary gear set 614 is coupled to the second node 616B of the second planetary gear set 616. The second node 614B of the first planetary gear set 614 is coupled to the third node 618C of the third planetary gear set 618 and the first node 620A of the fourth planetary gear set 620. The second node 618B of the third planetary gear set 618 is coupled to the second node 620B of the fourth planetary gear set 620. The third node 620C of the fourth planetary gear set 620 is coupled to the output shaft or member 622.

The transmission 610 includes six torque transmitting mechanisms 624, 626, 628, 630, 632, 634. The torque transmitting mechanisms 624, 626, 628, 630, 632, 634 are each selectively engageable to interconnect one of the first, second and third nodes of a planetary gear set with a stationary member 650 or the input shaft or member 612. The six torque transmitting mechanisms include three brakes 624, 626, 628 and three clutches 630, 632, 634. A first brake 624 selectively connects the first node 616A of the second planetary gear set 616 with a stationary member 650. A second brake 626 selectively connects the third node 614C of the first planetary gear set 614 with the stationary member 650. A third brake 628 selectively connects the first node 618A of the third planetary gear set 618 with the stationary member 650. A first clutch 630 selectively connects the first node 616A of the second planetary gear set 616 with the input shaft or member 612. A second clutch 632 selectively connects the second node 618B of the third planetary gear set 618 and the second node 620B of the fourth planetary gear set 620 with the input shaft or member 612. A third clutch 634 selectively connects the first node 614A of the first planetary gear set 614 and the third node 616C of the second planetary gear set 616 with the input shaft or member 612.

Referring now to both FIGS. 1 and 10, the planetary gear assemblies 14, 16 of FIG. 1 represent a pair of planetary gear sets 614, 616, 618, 620 of FIG. 5. For example, the planetary gear set assembly 14 of FIG. 1 represents the first and second planetary gear sets 614, 616 of FIG. 10. The planetary gear set assembly 16 of FIG. 1 represents the third and fourth planetary gear sets 618, 620 of FIG. 10. Further, the first node 14A of the first planetary gear assembly 14 represents the first node 614A of the first planetary gear set 614 and the third node 616C of the second planetary gear set 616. The second node 14B of the first planetary gear assembly 14 represents the second node 614B of the first planetary gear set 614 interconnected with the second node 616B of the second planetary gear set 616. The third node 14C of the first planetary gear set assembly 14 represents the third node 614C of the first planetary gear set 614. The fourth node 14D of the first planetary gear set assembly 14 represents the first node 616A of the second planetary gear set 616. The first node 16A of the second planetary gear assembly 16 represents the third node 618C of the third planetary gear set 618 interconnected with the first node 620A of the fourth planetary gear set 620. The second node 16B of the second planetary gear assembly 16 represents the second node 618B of the third planetary gear set 618 interconnected with the second node 620B of the fourth planetary gear set 620. The third node 16C of the second planetary gear set assembly 16 represents the third node 620C of the fourth planetary gear set 620. The fourth node 16D of the second planetary gear set assembly 16 represents the first node 618A of the third planetary gear set 618.

Referring now to FIG. 11, a stick diagram presents a schematic layout of the embodiment of the nine speed transmission 510 according to the present invention. The clutches and couplings are correspondingly presented whereas the nodes of the planetary gear sets now appear as components of planetary gear sets such as sun gears, ring gears, planet gears and planet gear carriers.

For example, the planetary gear set assembly 614/616 is a pair of stacked planetary gear sets that share a sun/ring combination gear member. The planetary gear set assembly 614/616 includes a sun gear member 616A, a sun/ring combination gear member 614A/616C, a ring gear member 614C, a first planet gear carrier member 616B that rotatably supports a set of planet gears 616D (only one of which is shown), and a second planet gear carrier member 614B that rotatably supports a set of planet gears 614D (only one of which is shown). The sun gear member 616A is connected for common rotation with a first shaft or interconnecting member 636. The sun/ring combination gear member 614A/616C is connected for common rotation with a second shaft or interconnecting member 638. The ring gear member 614C is connected for common rotation with a third shaft or interconnecting member 640. The first planet carrier member 616B is connected for common rotation with a fourth shaft or interconnecting member 642. The second planet carrier member 614B is connected for common rotation with the fourth shaft or interconnecting member 642. The planet gears 616D are each configured to intermesh with both of the sun gear member 616A and the sun/ring combination gear member 614A/616C. The planet gears 614D are each configured to intermesh with both of the sun/ring combination gear member 614A/616C and the ring gear member 614C.

The planetary gear set assembly 618/620 is a pair of stacked planetary gear sets that share a sun/ring combination gear member. The planetary gear set assembly 618/620 includes a sun gear member 618A, a sun/ring combination gear member 618C/620A, a ring gear member 620C, a first planet gear carrier member 618B that rotatably supports a set of planet gears 618D (only one of which is shown), and a second planet gear carrier member 620B that rotatably supports a set of planet gears 620D (only one of which is shown). The sun gear member 618A is connected for common rotation with a fifth shaft or interconnecting member 644. The sun/ring combination gear member 618C/620A is connected for common rotation with a third shaft or interconnecting member 642. The ring gear member 620C is connected for common rotation with the output shaft or member 622. The first planet carrier member 618B is connected for common rotation with a sixth shaft or interconnecting member 646. The second planet carrier member 620B is connected for common rotation with the sixth shaft or interconnecting member 646. The planet gears 618D are each configured to intermesh with both of the sun gear member 618A and the sun/ring combination gear member 618C/620A. The planet gears 620D are each configured to intermesh with both of the sun/ring combination gear member 618C/620A and the ring gear member 620C.

The input shaft or member 612 is preferably continuously connected to an engine (not shown) or to a turbine of a torque converter (not shown). The output shaft or member 622 is preferably continuously connected with the final drive unit or transfer case (not shown).

The torque transmitting mechanisms or brakes 624, 626, 628 and clutches 630, 632, 634 allow for selective interconnection of the shafts or interconnecting members, members of the planetary gear sets and the housing. For example, a first brake 624 is selectively engageable to interconnect the first shaft or interconnecting member 636 with the stationary member or transmission housing 650. A second brake 626 is selectively engageable to interconnect the third shaft or interconnecting member 640 with the stationary member or transmission housing 650. A third brake 628 is selectively engageable to interconnect the fifth shaft or interconnecting member 644 with the stationary member or transmission housing 650. A first clutch 630 is selectively engageable to interconnect the first shaft or interconnecting member 636 with the input shaft or member 612. A second clutch 632 is selectively engageable to interconnect the sixth shaft or interconnecting member 646 with the input shaft or member 612. The third clutch 634 is selectively engageable to interconnect the second shaft or interconnecting member 638 with the input shaft or member 612.

Referring now to FIGS. 10, 11 and 12, the operation of the embodiment of the nine speed transmissions 610 will be described. It will be appreciated that the transmissions 610 are capable of transmitting torque from the input shaft or member 612 to the output shaft or member 622 in at least nine forward speed or torque ratios and at least one reverse speed or torque ratio with a triple overdrive. Each forward and reverse speed or torque ratio is attained by engagement of one or more of the torque transmitting mechanisms (i.e. first brake 624, second brake 626, third brake 628, first clutch 630, second clutch 632, and third clutch 634), as will be explained below. FIG. 12 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the second brake 626, the third brake 628, and the first clutch 630 are engaged or activated. The second brake 626 connects the third shaft or interconnecting member 640 with the stationary member or transmission housing 650 in order to prevent the third shaft or interconnecting member 640 and therefore the ring gear member 614C of the first planetary gear set assembly 614/616 from rotating relative to the transmission housing 650. The third brake 628 connects the fifth shaft or interconnecting member 644 with the stationary member or transmission housing 650 in order to prevent the fifth shaft or interconnecting member 644 and therefore the sun gear member 618A of the second planetary gear set assembly 618/620. The first clutch 630 connects the first shaft or interconnecting member 636 with the input shaft or member 612 in order to provide common rotation between the sun gear member 616A of the first planetary gear set assembly 614/616 and the input shaft or member 612. Likewise, the nine forward ratios are achieved through different combinations of clutch and brake engagement, as shown in FIG. 12.

It will be appreciated that the foregoing explanation of operation and gear states of the nine speed transmission 610 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
an input member;
an output member;
first and second planetary gear set assemblies each having first, second, third, and fourth members, wherein the output member is continuously interconnected with the third member of the second planetary gear set assembly;
a first interconnecting member continuously interconnecting the second member of the first planetary gear set assembly with the first member of the second planetary gear set assembly;
six torque transmitting mechanisms each selectively engageable to interconnect one of the first members, second members, third members, and fourth members of the planetary gear set assemblies with at least one of the input member and a stationary member; and
wherein the torque transmitting mechanisms are selectively engageable in combinations of at least three to establish at least nine forward speed ratios and at least one reverse speed ratio between the input member and the output member, and
wherein the first planetary gear set assembly includes a first and a second planetary gear sets each having a first, second, and third members, wherein the first member of the first planetary gear set assembly includes the first member of the first planetary gear set, the second member of the first planetary gear set assembly includes the second member of the first planetary gear set directly interconnected to the third member of the second planetary gear set by a second interconnecting member, the third member of the first planetary gear set assembly includes the third member of the first planetary gear set directly interconnected to the second member of the second planetary gear set by a third interconnecting member, and the fourth member of the first planetary gear set assembly includes the first member of the second planetary gear set.

2. The transmission of claim 1 wherein three of the six torque transmitting mechanisms are clutches and three of the six torque transmitting mechanisms are brakes.

3. The transmission of claim 1 wherein a first of the six torque transmitting mechanisms is selectively engageable to directly interconnect the fourth member of the first planetary gear set assembly with the stationary member.

4. The transmission of claim 1 wherein a second of the six torque transmitting mechanisms is selectively engageable to directly interconnect the third member of the first planetary gear set assembly with the stationary member.

5. The transmission of claim 1 wherein a third of the six torque transmitting mechanisms is selectively engageable to directly interconnect the fourth member of the second planetary gear set assembly with the stationary member.

6. The transmission of claim 1 wherein a fourth of the six torque transmitting mechanisms is selectively engageable to directly interconnect the third member of the first planetary gear set assembly with the input member.

7. The transmission of claim 1 wherein a fifth of the six torque transmitting mechanisms is selectively engageable to directly interconnect the second member of the second planetary gear set assembly with the input member.

8. The transmission of claim 1 wherein a sixth of the six torque transmitting mechanisms is selectively engageable to directly interconnect the first member of the first planetary gear set assembly with the input member.

9. The transmission of claim 1 wherein a first of the six torque transmitting mechanisms is selectively engageable to directly interconnect the fourth member of the first planetary gear set assembly with the stationary member, a second of the six torque transmitting mechanisms is selectively engageable to directly interconnect the third member of the first planetary gear set assembly with the stationary member, a third of the six torque transmitting mechanisms is selectively engageable to directly interconnect the fourth member of the second planetary gear set assembly with the stationary member, a fourth of the six torque transmitting mechanisms is selectively engageable to directly interconnect the third member of the first planetary gear set assembly with the input member, a fifth of the six torque transmitting mechanisms is selectively engageable to directly interconnect the second member of the second planetary gear set assembly with the input member, and a sixth of the six torque transmitting mechanisms is selectively engageable to directly interconnect the first member of the first planetary gear set assembly with the input member.

10. The transmission of claim 1 wherein the second planetary gear set assembly includes a third and a fourth planetary gear sets each having a first, second, and third members, wherein the first member of the second planetary gear set assembly includes the first member of the third planetary gear set, the second member of the second planetary gear set assembly includes the second member of the third planetary gear set directly interconnected to the third member of the fourth planetary gear set by a fourth interconnecting member, the third member of the second planetary gear set assembly includes the third member of the third planetary gear set directly interconnected to the second member of the fourth planetary gear set by a fifth interconnecting member, and the fourth member of the second planetary gear set assembly includes the first member of the fourth planetary gear set.

11. The transmission of claim 10 wherein the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

12. The transmission of claim 10 wherein the first members of the planetary gear sets are sun gears, the second members of the first and third planetary gear sets are planet carrier members, the second members of the second and fourth planetary gear sets are ring gears, the third members of the first and third planetary gear sets are ring gears, and the third member of the second and fourth planetary gear sets are planet carrier members.

13. The transmission of claim 1 wherein the second planetary gear set assembly includes a third and a fourth planetary gear sets each having a first, second, and third members, wherein the first member of the second planetary gear set assembly includes the first member of the fourth planetary gear set, the second member of the second planetary gear set assembly includes the second member of the fourth planetary gear set directly interconnected to the third member of the third planetary gear set by a fourth interconnecting member, the third member of the second planetary gear set assembly includes the second member of the third planetary gear set, and the fourth member of the second planetary gear set assembly includes the first member of the third planetary gear set directly interconnected to the first member of the fourth planetary gear set by a fifth interconnecting member.

14. The transmission of claim 13 wherein the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

15. The transmission of claim 1 wherein the second planetary gear set assembly includes a third and a fourth planetary gear sets each having a first, second, and third members, wherein the first member of the second planetary gear set assembly includes the third member of the third planetary gear set directly interconnected to the first member of the fourth planetary gear set by a fourth interconnecting member, the second member of the second planetary gear set assembly includes the second member of the fourth planetary gear set directly interconnected to the second member of the third planetary gear set by a fifth interconnecting member, the third member of the second planetary gear set assembly includes the third member of the fourth planetary gear set, and the fourth member of the second planetary gear set assembly includes the first member of the third planetary gear set.

16. The transmission of claim 15 wherein the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

17. The transmission of claim 15 wherein the first members of the first, second and third planetary gear sets are sun gears, the second members of the first, third and fourth planetary gear sets are planet carrier members, the second member of the second planetary gear set is a ring gear, the third members of the first and fourth planetary gear sets are ring gears, the third member of the second planetary gear set is a planet carrier member, and the third member of the third planetary gear set and the first member of the fourth planetary gear set combine to form a combination sun/ring gear member.

18. The transmission of claim 1 wherein the first planetary gear set assembly includes a first and a second planetary gear sets each having a first, second, and third members and the second planetary gear set assembly includes a third and a fourth planetary gear sets each having a first, second, and third members, wherein the first member of the first planetary gear set assembly includes the first member of the first planetary gear set directly interconnected to the third member of the second planetary gear set by a second interconnecting member, the second member of the first planetary gear set assembly includes the second member of the first planetary gear set directly interconnected to the second member of the second planetary gear set by a third interconnecting member, the third member of the first planetary gear set assembly includes the third member of the first planetary gear set, and the fourth member of the first planetary gear set assembly includes the first member of the second planetary gear set, and wherein the first member of the second planetary gear set assembly includes the third member of the third planetary gear set directly interconnected to the first member of the fourth planetary gear set by a fourth interconnecting member, the second member of the second planetary gear set assembly includes the second member of the fourth planetary gear set directly interconnected to the second member of the third planetary gear set by a fifth interconnecting member, the third member of the second planetary gear set assembly includes the third member of the fourth planetary gear set, and the fourth member of the second planetary gear set assembly includes the first member of the third planetary gear set.

19. The transmission of claim 15 wherein the first members of the second and third planetary gear sets are sun gears, the second members of the first, second, third, and fourth planetary gear sets are planet carrier members, the third members of the first and fourth planetary gear sets are ring gears, the third member of the second planetary gear set and the first member of the first planetary gear set combine to form a first combination sun/ring gear member, and the third member of the third planetary gear set and the first member of the fourth planetary gear set combine to form a second combination sun/ring gear member.

20. A transmission comprising:
an input member;
an output member;
first and second planetary gear set assemblies each having first, second, third, and fourth members, wherein the output member is continuously interconnected with the third member of the second planetary gear set assembly;
a first interconnecting member continuously interconnecting the second member of the first planetary gear set assembly with the first member of the second planetary gear set assembly;
a first torque transmitting mechanism selectively engageable to directly interconnect the fourth member of the first planetary gear set assembly with a stationary member;
a second torque transmitting mechanism selectively engageable to directly interconnect the third member of the first planetary gear set assembly with the stationary member;
a third torque transmitting mechanism selectively engageable to directly interconnect the fourth member of the second planetary gear set assembly with the stationary member;

a fourth torque transmitting mechanism selectively engageable to directly interconnect the third member of the first planetary gear set assembly with the input member;

a fifth torque transmitting mechanism selectively engageable to directly interconnect the second member of the second planetary gear set assembly with the input member;

a sixth torque transmitting mechanism selectively engageable to directly interconnect the first member of the first planetary gear set assembly with the input member, and wherein the torque transmitting mechanisms are selectively engageable in combinations of at least three to establish at least nine forward speed ratios and at least one reverse speed ratio between the input member and the output member; and wherein the first planetary gear set assembly includes a first and a second planetary gear sets each having a first, second, and third members, wherein the first member of the first planetary gear set assembly includes the first member of the first planetary gear set, the second member of the first planetary gear set assembly includes the second member of the first planetary gear set directly interconnected to the third member of the second planetary gear set by a second interconnecting member, the third member of the first planetary gear set assembly includes the third member of the first planetary gear set directly interconnected to the second member of the second planetary gear set by a third interconnecting member, and the fourth member of the first planetary gear set assembly includes the first member of the second planetary gear set.

21. The transmission of claim 20 wherein the second planetary gear set assembly includes a third and a fourth planetary gear sets each having a first, second, and third members, wherein the first member of the second planetary gear set assembly includes the first member of the third planetary gear set, the second member of the second planetary gear set assembly includes the second member of the third planetary gear set directly interconnected to the third member of the fourth planetary gear set by a fourth interconnecting member, the third member of the second planetary gear set assembly includes the third member of the third planetary gear set directly interconnected to the second member of the fourth planetary gear set by a fifth interconnecting member, and the fourth member of the second planetary gear set assembly includes the first member of the fourth planetary gear set.

22. The transmission of claim 21 wherein the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

23. The transmission of claim 21 wherein the first members of the planetary gear sets are sun gears, the second members of the first and third planetary gear sets are planet carrier members, the second members of the second and fourth planetary gear sets are ring gears, the third members of the first and third planetary gear sets are ring gears, and the third member of the second and fourth planetary gear sets are planet carrier members.

24. The transmission of claim 20 wherein the second planetary gear set assembly includes a third and a fourth planetary gear sets each having a first, second, and third members, wherein the first member of the second planetary gear set assembly includes the first member of the fourth planetary gear set, the second member of the second planetary gear set assembly includes the second member of the fourth planetary gear set directly interconnected to the third member of the third planetary gear set by a fourth interconnecting member, the third member of the second planetary gear set assembly includes the second member of the third planetary gear set, and the fourth member of the second planetary gear set assembly includes the first member of the third planetary gear set directly interconnected to the first member of the fourth planetary gear set by a fifth interconnecting member.

25. The transmission of claim 24 wherein the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

26. The transmission of claim 20 wherein the second planetary gear set assembly includes a third and a fourth planetary gear sets each having a first, second, and third members, wherein the first member of the second planetary gear set assembly includes the third member of the third planetary gear set directly interconnected to the first member of the fourth planetary gear set by a fourth interconnecting member, the second member of the second planetary gear set assembly includes the second member of the fourth planetary gear set directly interconnected to the second member of the third planetary gear set by a fifth interconnecting member, the third member of the second planetary gear set assembly includes the third member of the fourth planetary gear set, and the fourth member of the second planetary gear set assembly includes the first member of the third planetary gear set.

27. The transmission of claim 26 wherein the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

28. The transmission of claim 26 wherein the first members of the first, second and third planetary gear sets are sun gears, the second members of the first, third and fourth planetary gear sets are planet carrier members, the second member of the second planetary gear set is a ring gear, the third members of the first and fourth planetary gear sets are ring gears, the third member of the second planetary gear set is a planet carrier member, and the third member of the third planetary gear set and the first member of the fourth planetary gear set combine to form a combination sun/ring gear member.

29. The transmission of claim 20 wherein the first planetary gear set assembly includes a first and a second planetary gear sets each having a first, second, and third members and the second planetary gear set assembly includes a third and a fourth planetary gear sets each having a first, second, and third members, wherein the first member of the first planetary gear set assembly includes the first member of the first planetary gear set directly interconnected to the third member of the second planetary gear set by a second interconnecting member, the second member of the first planetary gear set assembly includes the second member of the first planetary gear set directly interconnected to the second member of the second planetary gear set by a third interconnecting member, the third member of the first planetary gear set assembly includes the third member of the first planetary gear set, and the fourth member of the first planetary gear set assembly includes the first member of the second planetary gear set, and wherein the first member of the second planetary gear set assembly includes the third member of the third planetary gear set directly interconnected to the first member of the fourth planetary gear set by a fourth interconnecting member, the second member of the second planetary gear set assembly includes the second member of the fourth planetary gear set directly interconnected to the second member of the third planetary gear set by a fifth interconnecting member, the third member of the second planetary gear set assembly includes the third member of the fourth planetary gear set, and the fourth member of the second planetary gear set assembly includes the first member of the third planetary gear set.

30. The transmission of claim 29 wherein the first members of the second and third planetary gear sets are sun gears, the second members of the first, second, third, and fourth planetary gear sets are planet carrier members, the third members of the first and fourth planetary gear sets are ring gears, the third member of the second planetary gear set and the first member of the first planetary gear set combine to form a first combination sun/ring gear member, and the third member of the third planetary gear set and the first member of the fourth planetary gear set combine to form a second combination sun/ring gear member.

31. A transmission comprising:
an input member;
an output member;
first, second, third and fourth planetary gear sets each having first, second and third members, wherein the output member is continuously interconnected to at least one of the second and third members of the third and fourth planetary gear sets;
a first interconnecting member continuously interconnecting the second member of the first planetary gear set with at least one of the first and third members of the third and fourth planetary gear sets;
a second interconnecting member continuously interconnecting the second member of the first planetary gear set with the third member of the second planetary gear set;
a third interconnecting member continuously interconnecting the third member of the first planetary gear set with the second member of the second planetary gear set;
a fourth interconnecting member continuously interconnecting a member of the third planetary gear set with a member of the fourth planetary gear set;
a fifth interconnecting member continuously interconnecting a member of the third planetary gear set with a member of the fourth planetary gear set;
a first torque transmitting mechanism selectively engageable to directly interconnect the first member of the second planetary gear set with a stationary member;
a second torque transmitting mechanism selectively engageable to directly interconnect the third member of the first planetary gear set with the stationary member;
a third torque transmitting mechanism selectively engageable to directly interconnect at least one of the first members of the third and fourth planetary gear sets with the stationary member;
a fourth torque transmitting mechanism selectively engageable to directly interconnect the third member of the first planetary gear set assembly with the input member;
a fifth torque transmitting mechanism selectively engageable to directly interconnect the second member of the second planetary gear set assembly with the input member, and a sixth torque transmitting mechanism selectively engageable to directly interconnect the first member of the first planetary gear set assembly with the input member; and
wherein the torque transmitting mechanisms are selectively engageable in combinations of at least three to establish at least nine forward speed ratios and at least one reverse speed ratio between the input member and the output member.

32. The transmission of claim 31 wherein the first interconnecting member continuously interconnects the second member of the first planetary gear set with the first member of the third planetary gear set, the fourth interconnecting member continuously interconnects the second member of the third planetary gear set with the third member of the fourth planetary gear set, and the fifth interconnecting member continuously interconnecting the third member of the third planetary gear set with the second member of the fourth planetary gear set.

33. The transmission of claim 32 wherein the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

34. The transmission of claim 32 wherein the first members of the planetary gear sets are sun gears, the second members of the first and third planetary gear sets are planet carrier members, the second members of the second and fourth planetary gear sets are ring gears, the third members of the first and third planetary gear sets are ring gears, and the third member of the second and fourth planetary gear sets are planet carrier members.

35. The transmission of claim 31 wherein the second planetary gear set assembly includes a third and a fourth planetary gear sets each having a first, second, and third members, wherein the first member of the second planetary gear set assembly includes the first member of the fourth planetary gear set, the second member of the second planetary gear set assembly includes the second member of the fourth planetary gear set directly interconnected to the third member of the third planetary gear set by a fourth interconnecting member, the third member of the second planetary gear set assembly includes the second member of the third planetary gear set, and the fourth member of the second planetary gear set assembly includes the first member of the third planetary gear set directly interconnected to the first member of the fourth planetary gear set by a fifth interconnecting member.

36. The transmission of claim 35 wherein the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

37. The transmission of claim 31 wherein the second planetary gear set assembly includes a third and a fourth planetary gear sets each having a first, second, and third members, wherein the first member of the second planetary gear set assembly includes the third member of the third planetary gear set directly interconnected to the first member of the fourth planetary gear set by a fourth interconnecting member, the second member of the second planetary gear set assembly includes the second member of the fourth planetary gear set directly interconnected to the second member of the third planetary gear set by a fifth interconnecting member, the third member of the second planetary gear set assembly includes the third member of the fourth planetary gear set, and the fourth member of the second planetary gear set assembly includes the first member of the third planetary gear set.

38. The transmission of claim 37 wherein the first members of the planetary gear sets are sun gears, the second members of the first, third and fourth planetary gear sets are planet carrier members, the second member of the second planetary gear set is a ring gear, the third members of the first, third and fourth planetary gear sets are ring gears, and the third member of the second planetary gear set is a planet carrier member.

39. The transmission of claim 37 wherein the first members of the first, second and third planetary gear sets are sun gears, the second members of the first, third and fourth planetary gear sets are planet carrier members, the second member of the second planetary gear set is a ring gear, the third members of the first and fourth planetary gear sets are ring gears, the third member of the second planetary gear set is a planet carrier member, and the third member of the third planetary gear set and the first member of the fourth planetary gear set combine to form a sun/ring combination gear member.

* * * * *